United States Patent
Ruigrok et al.

(10) Patent No.: US 10,670,425 B2
(45) Date of Patent: *Jun. 2, 2020

(54) SYSTEM FOR MEASURING ANGULAR POSITION AND METHOD OF STRAY FIELD CANCELLATION

(71) Applicant: NXP B.V., Eindhoven (NL)

(72) Inventors: Jaap Ruigrok, Asten (NL); Edwin Schapendonk, Oss (NL); Marijn Nicolaas van Dongen, Utrecht (NL)

(73) Assignee: NXP B.V., Eindhoven (NL)

( * ) Notice: Subject to any disclaimer, the term of this patent is extended or adjusted under 35 U.S.C. 154(b) by 89 days.

This patent is subject to a terminal disclaimer.

(21) Appl. No.: 15/941,216

(22) Filed: Mar. 30, 2018

(65) Prior Publication Data

US 2019/0301893 A1    Oct. 3, 2019

(51) Int. Cl.
  *G01N 7/00* (2006.01)
  *G01D 5/16* (2006.01)
  *G01D 5/14* (2006.01)

(52) U.S. Cl.
  CPC ........... *G01D 5/16* (2013.01); *G01D 5/145* (2013.01)

(58) Field of Classification Search
  CPC ......... G01D 5/145; G01D 5/147; G01D 5/12; G01D 5/14; G01D 5/16; G01D 5/165; G01D 5/2457; G01D 5/2013; G01D 5/2046; G01D 5/24476; G01D 5/245; G01R 33/025; G01R 33/07; G01R 33/0206; G01R 33/06; G01R 33/063; G01R 33/09; G01R 33/093; G01R 33/0052; G01R 33/18;
  (Continued)

(56) References Cited

U.S. PATENT DOCUMENTS 5,880,586 A    3/1999    Dukart et al.
6,972,558 B1   12/2005   Robinson
(Continued)

FOREIGN PATENT DOCUMENTS

EP    3 587 775 A1       1/2020
WO    WO-2006106490 A2   10/2006
WO    WO 2017/140495 A1  8/2017

OTHER PUBLICATIONS

U.S. Appl. No. 15/906,125, not yet published; 27 pages (filed Feb. 27, 2018).
(Continued)

*Primary Examiner* — Thang X Le
(74) *Attorney, Agent, or Firm* — Charlene R. Jacobsen (57) ABSTRACT

A system for determining angular position includes a dipole magnet having an axis of rotation, wherein the dipole magnet produces a magnetic field. A first magnetic field sensor produces a first output signal and a second magnetic field sensor produces a second output signal in response to the magnetic field. The magnetic field sensors are operated in a saturation mode in which the magnetic field sensors are largely insensitive to the field strength of the magnetic field. Thus, the first output signal is indicative of a first direction of the magnetic field and the second output signal is indicative of a second direction of the magnetic field. Methodology performed by a processing circuit entails combining the first and second output signals to obtain a rotation angle value of the magnet in which angular error from a stray magnetic field is substantially cancelled.

11 Claims, 7 Drawing Sheets

(58) Field of Classification Search
CPC ............. G01N 27/9033; G01N 27/902; G01N 27/9013; G01N 27/904; G01N 27/223; G01N 27/82; G01N 27/9093
See application file for complete search history.

(56) References Cited

U.S. PATENT DOCUMENTS

| | | | |
|---|---|---|---|
| 7,019,516 | B2 | 3/2006 | Tokunaga et al. |
| 8,203,329 | B2 | 6/2012 | Hohe et al. |
| 8,421,453 | B2 | 4/2013 | Bauer |
| 8,664,945 | B2 | 3/2014 | Laville et al. |
| 9,097,559 | B2 | 8/2015 | Ronnat et al. |
| 9,116,198 | B2 | 8/2015 | Cai et al. |
| 9,207,100 | B2 | 12/2015 | Frachon et al. |
| 9,746,346 | B2 | 8/2017 | Ausserlechner |
| 9,892,836 | B2 | 2/2018 | Ausserlechner |
| 9,933,448 | B1 | 4/2018 | Binder |
| 10,254,130 | B2 | 4/2019 | Burgdorf et al. |
| 2008/0026587 | A1 | 1/2008 | Yun |
| 2008/0231262 | A1* | 9/2008 | Wolf .................. G01D 5/145 324/207.2 |
| 2012/0038359 | A1 | 2/2012 | Saruki et al. |
| 2012/0161755 | A1* | 6/2012 | Masson ................ G01D 5/145 324/207.24 |
| 2015/0226581 | A1* | 8/2015 | Schott ................. G01D 5/145 324/207.2 |
| 2016/0003586 | A1 | 1/2016 | Pace |
| 2016/0033586 | A1* | 2/2016 | Hakenes ............... G01R 33/07 324/251 |
| 2017/0139016 | A1 | 5/2017 | Reimann et al. |
| 2017/0248445 | A1* | 8/2017 | Ausserlechner ..... G01D 5/2006 |
| 2017/0356967 | A1* | 12/2017 | Romero ............... G01D 3/0365 |
| 2018/0017418 | A1* | 1/2018 | Deak ........................ G01B 7/30 |
| 2018/0087926 | A1* | 3/2018 | Ausserlechner ....... G01D 5/245 |
| 2018/0245914 | A1* | 8/2018 | Furukawa ............... G01B 21/22 |
| 2018/0335441 | A1* | 11/2018 | Hammerschmidt ..... G01D 5/12 |

OTHER PUBLICATIONS

U.S. Appl. No. 16/542,531; 40 pages (filed Aug. 16, 2019).
Non Final Office Action; U.S. Appl. No. 15/906,125; 16 pages (dated Oct. 30, 2019).
Final Office Action; U.S. Appl. No. 15/906,125; 13 pages (dated Apr. 9, 2020).

* cited by examiner

SYSTEM FOR MEASURING ANGULAR POSITION AND METHOD OF STRAY FIELD CANCELLATION

TECHNICAL FIELD OF THE INVENTION

The present invention relates generally to magnetic field sensors. More specifically, the present invention relates to systems incorporating the magnetic field sensors for measuring angular position while substantially cancelling stray magnetic fields.

BACKGROUND OF THE INVENTION

Angular sensors, for measuring an angle of rotation or angular position, are implemented in a wide array of automotive and industrial applications. For example, in the automotive industry, angular sensors may be used for valve control, pedal position sensing, steering wheel position sensing, throttle position sensing, motor-shaft position sensing, and multiple other uses. Typically, magnetic field sensors are preferred because their contactless measurement makes them immune to mechanical wear. In these applications, a change is measured in the magnetic field of a magnet mounted on the moving part. The magnetic field is not hindered by debris and other non-magnetic materials. Some magnetic field sensors are based upon the magnetoresistive effect in which a material has a tendency to change the value of its electrical resistance in response to an externally-applied magnetic field. Magnetoresistive devices include, for example, Anisotropic Magneto Resistance (AMR) technology, Giant Magneto Resistance (GMR), Tunnel Magneto Resistance (TMR), and so forth.

BRIEF DESCRIPTION OF THE DRAWINGS

The accompanying figures in which like reference numerals refer to identical or functionally similar elements throughout the separate views, the figures are not necessarily drawn to scale, and which together with the detailed description below are incorporated in and form part of the specification, serve to further illustrate various embodiments and to explain various principles and advantages all in accordance with the present invention.

DETAILED DESCRIPTION

In overview, the present disclosure concerns systems and methodology for measuring angular rotation of an object. More particularly, systems include an assembly of magnetic field sensors located in the vicinity of a polarized cylindrical object (e.g., a dipole magnet) whose angular rotation can be accurately measured by combining the outputs of the magnetic field sensors. The systems and methodology can allow angular rotation measurements up to 360°. Further, the systems and methodology can achieve stray magnetic field suppression, without the need for shielding structures, for any type of magnetic field sensor that provides a response to the angle of an external magnetic field while generally not providing a response to the field strength of the external magnetic field. Still further, the adverse effects of misalignments (e.g., eccentricity, non-uniformities of the magnet, and so forth) can be strongly reduced by the assembly of the magnetic field sensors for improved angular accuracy, sensitivity, and enhanced robustness.

The instant disclosure is provided to further explain in an enabling fashion the best modes, at the time of the application, of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It should be understood that the use of relational terms, if any, such as first and second, top and bottom, and the like are used solely to distinguish one from another entity or action without necessarily requiring or implying any actual such relationship or order between such entities or actions. Furthermore, some of the figures may be illustrated using various shading and/or hatching to distinguish the different elements produced within the various structural layers. These different elements within the structural layers may be produced utilizing current and upcoming microfabrication techniques of depositing, patterning, etching, and so forth. Accordingly, although different shading and/or hatching is utilized in the illustrations, the different elements within the structural layers may be formed out of the same material.

Figure 1:
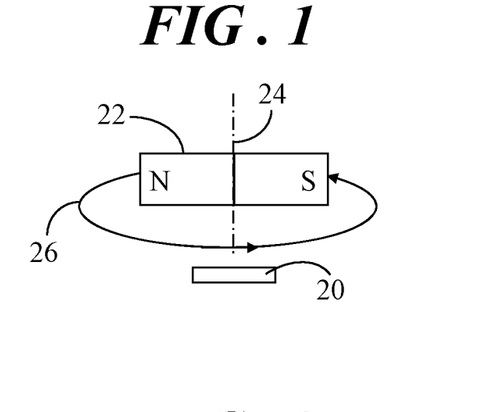
FIG. 1 shows a simplified side view of a magnetic field sensor in proximity to a magnet.

Referring to FIG. 1, FIG. 1 shows a simplified side view of a magnetic field sensor 20 in proximity to a magnet 22. In this example, magnet 22 may be a dipole magnet having a north pole (labeled N) on one side and a south pole (labeled S) on the other side. Magnet 22 may be a permanent magnet in the form of a cylinder, bar, disc, ring, or any other suitable shape. For rotation angle sensing, magnet 22 may be coupled to a rotating object, such as an axle or shaft (not shown). Thus, magnet 22 is configured to rotate about an axis of rotation 24 relative to magnetic field sensor 20. Further, magnet 22 produces a magnetic field 26 that rotates along with magnet 22 relative to magnetic field sensor 20. In this example configuration, magnetic field sensor 20 is vertically displaced below the center of magnet 22. Magnetic field sensor 20 may be a magnetoresistive device, such as AMR, GMR, TMR, or similar technology, that is configured to detect magnetic field 26 produced by magnet 22.

Figure 2:
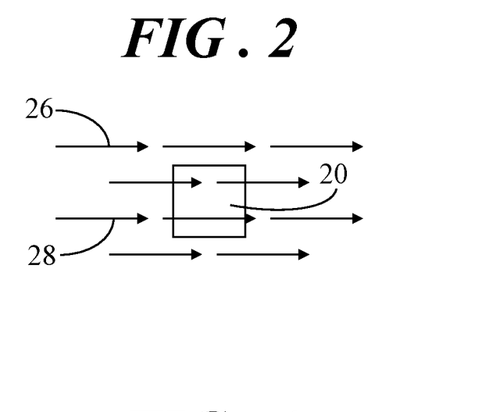
FIG. 2 shows a simplified top view of the magnetic field sensor of FIG. 1 with a magnetic field that is "seen" or detected by the magnetic field sensor.

With reference to FIGS. 1 and 2, FIG. 2 shows a simplified top view of magnetic field sensor 20 with a magnetic field that is "seen" or detected by magnetic field sensor 20. Magnetic field 26 has an in-plane component, denoted by arrows 28, that is detectable by magnetic field sensor 20. Thus, in the ideal configuration represented by FIG. 2, magnetic field sensor 20 measures the in-plane magnetic field component 28 of magnetic field 26.

Figure 3:
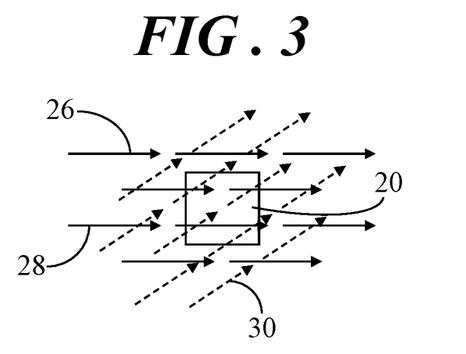
FIG. 3 shows a simplified top view of the magnetic field sensor of FIG. 1 in the presence of an unwanted stray magnetic field.

FIG. 3 shows a simplified top view of magnetic field sensor 20 in the presence of an unwanted stray magnetic field 30, denoted by tilted dashed line arrows. More particularly, FIG. 3 represents both in-plane magnetic field component 28 of magnetic field 26 and stray magnetic field 30. Stray magnetic fields (e.g., stray magnetic field 30) change the magnetic field being measured by magnetic field sensor 20. Stray magnetic field 30 is sometimes referred to as an interference field since it changes the magnetic field being measured by magnetic field sensor 20, and therefore introduces error into the measurement signal.

Figure 4:
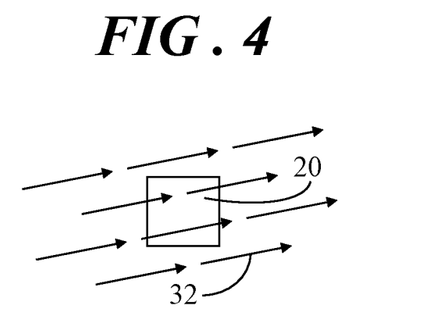
FIG. 4 shows a simplified top view of the magnetic field sensor of FIG. 1 with a magnetic field "seen" or detected by the magnetic field sensor, in which the magnetic field is a combination of the external magnetic field and the stray magnetic field.

Referring now to FIG. 4, FIG. 4 shows a simplified top view of magnetic field sensor 20 with a magnetic field 32, denoted by tilted solid arrows, that is "seen" or detected by magnetic field sensor 20. In the presence of unwanted stray magnetic field 30 (FIG. 3), the detected magnetic field 32 is a summation of an in-plane magnetic field component 28 of magnetic field 26 and the in-plane magnetic stray field component, referred to herein as stray magnetic field 30. Thus, magnetic field sensor 20 is sensitive to both in-plane magnetic field component 28 produced by magnet 22 and to stray magnetic field 30.

Figure 5:
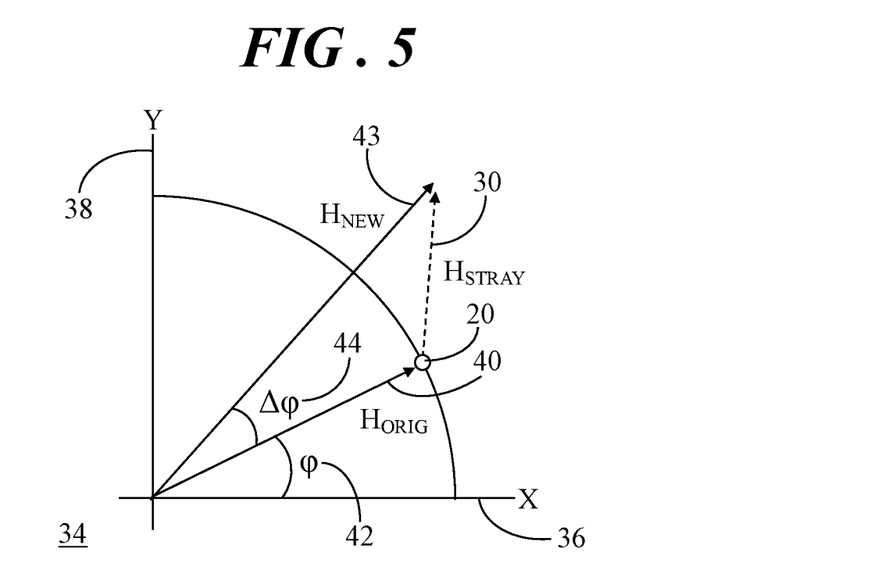
FIG. 5 shows a graph demonstrating the sensitivity of the magnetic field sensor of FIG. 1 to the unwanted stray magnetic field.

FIG. 5 shows a graph 34 of the sensitivity of magnetic field sensor 20 to the unwanted stray magnetic field 30. In particular, graph 34 shows vectors in a Cartesian coordinate system that includes an X-axis 36 and a Y-axis 38. In this example, magnetic field sensor 20 is operating in a saturation mode. In general, the saturation mode is when the in-plane component of the total magnetic field (for example, in-plane magnetic field component 28 of magnetic field 26) is above a certain field strength level (referred to as a saturation field) where the magnetic moments in the magnetic field sensor are all aligned to a great extent in the same direction as the in-plane component of the total external field. Therefore, the output of the angular magnetic field sensor device reflects the direction of the external magnetic field in the plane of the sensor and not the field strength of the magnetic field.

In the saturation mode, a first vector 40, labeled $H_{ORIG}$, represents the direction of the magnetic field 26 from magnet 22 at the position of sensor 20 in the absence of stray magnetic field 30. A rotation angle 42, labeled $\varphi$, thus represents a rotation angle value of magnet 22 relative to an original position of magnet 22 where, for example, the original angular position of magnet 22 is zero and is aligned with X-axis 36. A second vector 43, labeled $H_{NEW}$, represents the detected magnetic field 32 (FIG. 4) in the presence of stray magnetic field 30, labeled $H_{STRAY}$. The presence of stray magnetic field 30 leads to an angular error 44, labeled $\Delta\varphi$. Angular error 44 may be wrongly interpreted to be an additional angle that magnet 22 has rotated. Thus, an error condition or inaccurate measurement ensues because a determination may be made that a rotation angle value for magnet 22 is the combination of the actual rotation angle 42 plus the angular error 44 (e.g., $\varphi+\Delta\varphi$).

Therefore, in the single magnet sensor configuration of FIGS. 1-5, the effects of stray magnetic field 30 cannot be distinguished from the actual rotation of magnet 22. Consequently, neither detection of stray magnetic field 30 nor suppression may be accurately achieved from the output of a single magnetic field sensor 22 that provides only angular information.

The discussion presented above in connection with FIGS. 1-5 pertains to a magnetoresistive magnetic field sensor operating in the saturation mode. Hall effect sensors, which have a linear response to only a single component of a magnetic field, are another commonly used magnetic field sensor technology for angular measurement. However, magnetoresistive sensor technologies, such as AMR, TMR, GMR, and the like, have some distinct advantages over Hall sensors. Magnetoresistive sensor technologies may achieve better noise performance than Hall effect sensors. Additionally, magnetoresistive sensors may be operated reliably at much higher temperatures relative to Hall effect sensors and it may be possible to achieve higher angular accuracies with magnetoresistive sensors relative to Hall effect sensors.

Some of these advantages may be obtained by operating a magnetoresistive sensor in a saturation mode for angular measurements. In the saturation mode, the sensor is almost only sensitive to the angle of the magnetic field (e.g., the field angle) and hardly to the strength of the magnetic field (e.g., the field strength). The local magnetic field angle may therefore be measured relatively accurately, without being affected by magnetic field strength. One of the key challenges of implementing magnetoresistive sensor devices is the presence of disturbing magnetic fields of sources (e.g., stray magnetic field 30) other than the above-mentioned magnet 22. As demonstrated in graph 34, stray magnetic field 30 changes the magnetic field being measured by magnetic field sensor, thereby compromising the accuracy of the measured rotation angle. Embodiments described below include systems and methodology for achieving suppression of stray magnetic fields for magnetic field sensors, and in particular magnetoresistive sensors, operating in a saturation mode. Further, the systems and methodology can allow angular rotation measurements up to 360°.

Figure 6:
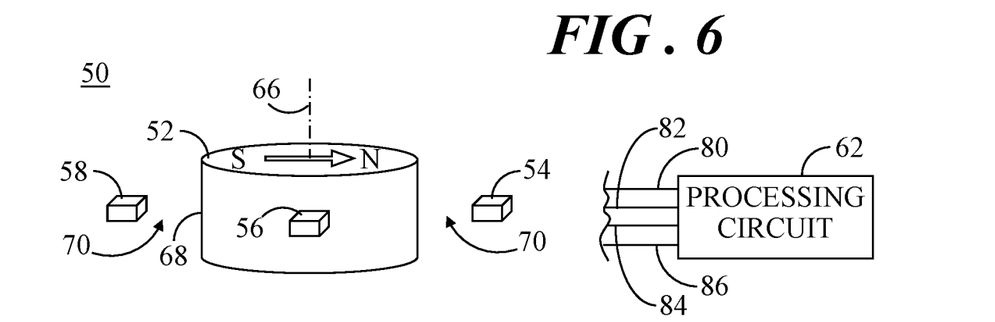
FIG. 6 shows a simplified perspective view of a system for rotation angle sensing in accordance with an embodiment.
Figure 7:
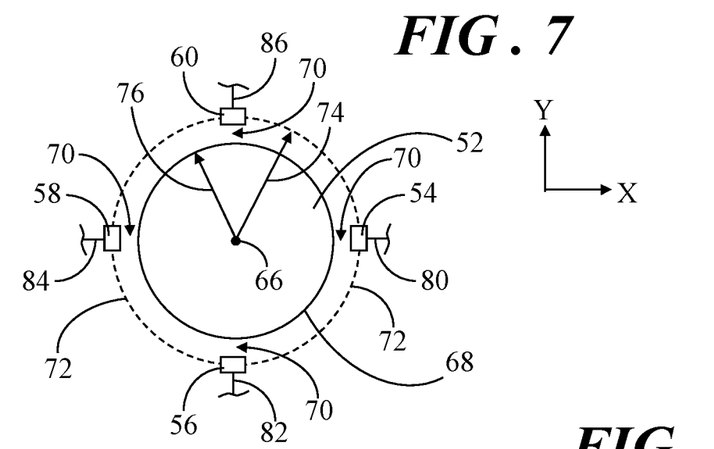
FIG. 7 shows a top view of an arrangement of magnetic field sensors surrounding a dipole magnet and implemented within the system of FIG. 6.

Referring now to FIGS. 6 and 7, FIG. 6 shows a simplified perspective view of a system 50 for rotation angle sensing in accordance with an embodiment and FIG. 7 shows a top view of an arrangement of magnetic field sensors surrounding a dipole magnet and implemented within system 50. In this illustrated configuration, system 50 includes a dipole magnet 52 and first, second, third, and fourth magnetic field sensors 54, 56, 58, 60, respectively. Fourth magnetic field sensor 60 is not visible in the perspective view of FIG. 6, but is visible in the top view of FIG. 7. First, second, third, and fourth magnetic field sensors 54, 56, 58, 60 may be coupled with a processing circuit 62. The coupling of processing circuit 62 with magnetic field sensors 54, 56, 58, 60 may be accomplished via a wired (denoted by shortened traces extending from processing circuit 62) or a wireless connection.

Processing 62 may be a separate die or may be integrated in a single package with first, second, third, and fourth magnetic field sensors 54, 56, 58, 60. Those skilled in the art will recognize that processing circuit 62 can encompass a wide variety of processing, control, or other structures. Therefore, in the interest of brevity and minimization of any risk of obscuring the principles and concepts of the various embodiments, further discussion of such structures, if any, will be limited to the essentials with respect to the principles and concepts of the various embodiments.

Dipole magnet 52 may be glued or otherwise attached to a rotatable object 64 (generally shown in FIG. 18) such as an axle, shaft, and the like. Thus, rotatable object 64 and magnet 52 (by virtue of its attachment to rotatable object 64) are configured to rotate about an axis of rotation 66. Dipole magnet 52 has two poles, a north pole (labeled N) on one side and a south pole (labeled S) on the other side. In this example, dipole magnet 52 is cylindrically-shaped and is uniformly diametrically magnetized (e.g., magnetized across its diameter). In alternative embodiments, dipole magnet 52 may be in the form of a bar, disc, ring, or any other suitable shape.

First, second, third, and fourth magnetic field sensors 54, 56, 58, 60 are spaced apart from an outer surface 68 of dipole magnet 52 such that an air gap 70 is formed between outer surface 68 and each of first, second, third, and fourth magnetic field sensors 54, 56, 58, 60. More particularly, first, second, third, and fourth magnetic field sensors 54, 56, 58, 60 are arranged at four locations along a circular path 72 (denoted by a circular dashed line in FIG. 7) about axis of rotation 66 of dipole magnet 52, in which a radius 74 of circular path 72 is greater than a radial dimension 76 (e.g., a radius) of dipole magnet 52. In some embodiments, first, second, third, and fourth magnetic field sensors 54, 56, 58, 60 may be located in a plane below the bottom surface of dipole magnet 52. In such a configuration, radius 74 of circular path 72 should be sufficiently larger than radius 76 of dipole magnet 52 to ensure that the magnetic field produced by magnet 52 makes a full 360° rotation when dipole magnet 52 makes a full 360° rotation.

FIGS. 6 and 7 do not show first, second, third, and fourth magnetic field sensors 54, 56, 58, 60 in a packaged form and attached to a corresponding structure for simplicity of illustration. Rather, first, second, third, and fourth magnetic field sensors 54, 56, 58, 60 are shown displaced away from outer surface 68 of dipole magnet 52 along the X and Y axes of the three-dimensional coordinate system. In an actual configuration, it should be readily apparent that first, second, third, and fourth magnetic field sensors 54, 56, 58, 60 will be packaged and attached to a support structure in suitable proximity to dipole magnet 52.

Figure 8:
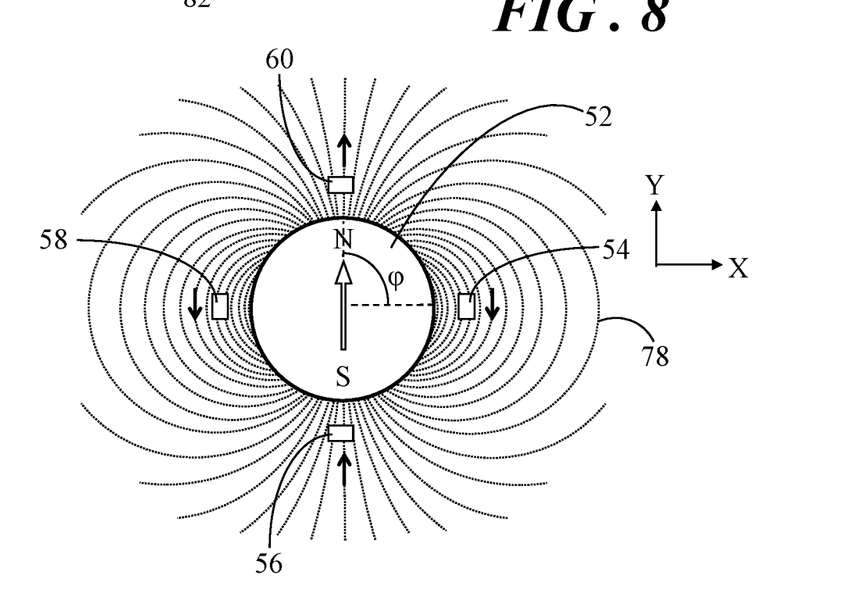
FIG. 8 shows a top view of a dipole magnet of the system of FIG. 6.

Referring to FIG. 8 in connection with FIGS. 6 and 7, FIG. 8 shows a top view of dipole magnet 52 of system 50. Dipole magnet 52 is configured to produce a magnetic field 78, depicted in FIG. 8 using flux lines. Arrows overlying magnetic field indicate the direction of magnetic field 78 at certain locations. It can be observed that there is an inversion of the field (denoted by the oppositely directed arrows) at the top/bottom with respect to the left/right of dipole magnet 52 in the planar top view of dipole magnet 52.

First and second magnetic field sensors 54, 56 are positioned relative to one another along circular path 72 such that a first direction of magnetic field 78 at first magnetic field sensor 54 opposes (e.g., is generally opposite to) a second direction of magnetic field 78 at second magnetic field sensor 56. Similarly, third and fourth magnetic field sensors 58, 60 are positioned relative to one another along circular path 72 such that the first direction of magnetic field 78 at third magnetic field sensor 58 opposes (e.g., is generally opposite to) the second direction of magnetic field 78 at fourth magnetic field sensor 60. These opposing directions of magnetic field 78 are represented by the inverted arrows in FIG. 8.

In the embodiment shown in FIG. 7, first and second magnetic field sensors 54, 56 are spaced apart ninety degrees from one another along circular path 72. Likewise, third and fourth magnetic sensors 58, 60 are spaced apart ninety degrees from one another along circular path 72. Accordingly, first and third magnetic field sensors 54, 58 diametrically oppose one another along circular path 72 and second and fourth magnetic field sensors 56, 60 diametrically oppose one another along circular path 72. That is, first and third magnetic sensors 54, 58 are located at opposite ends of the diameter of circular path 72 and second and fourth magnetic field sensors 56, 60 are likewise located at opposite ends of the diameter of circular path 72.

Processing circuit 62 may be implemented as an application specific integrated circuit (ASIC) that is customized to function with first, second, third, and fourth magnetic sensors 54, 56, 58, 60. Processing circuit 62 is represented in FIG. 6 by a simple block with a first conductive pathway 80 interconnecting first magnetic field sensor 54 to processing circuit 62, a second conductive pathway 82 interconnecting second magnetic field sensor 56 to processing circuit 62, a third conductive pathway 84 interconnecting third magnetic field sensor 58 to processing circuit 62, and a fourth conductive pathway 86 interconnecting fourth magnetic field sensor 60 to processing circuit 62. Again, conductive pathways 80, 82, 84, 86 may be wired, wireless, or some combination thereof.

First, second, third, and fourth magnetic field sensors 54, 56, 58, 60 may be magnetoresistive sense elements (e.g., AMR, GMR, TMR and other related technologies). Thus, first magnet field sensor 54 is configured to produce a first output signal in response to magnetic field 78, which is communicated to processing circuit 62 via first conductive pathway 80. Second magnetic field sensor 56 is configured to produce a second output signal in response to magnetic field 78, which is communicated to processing circuit 62 via second conductive pathway 82. Third magnetic field sensor 58 is configured to produce a third output signal in response to magnetic field 78, which is communicated to processing circuit 62 via third conductive pathway 84. And, fourth magnetic field sensor 60 is configured to produce a fourth output signal in response to magnetic field 78, which is communicated to processing circuit 62 via fourth conductive pathway 86.

Figure 9:
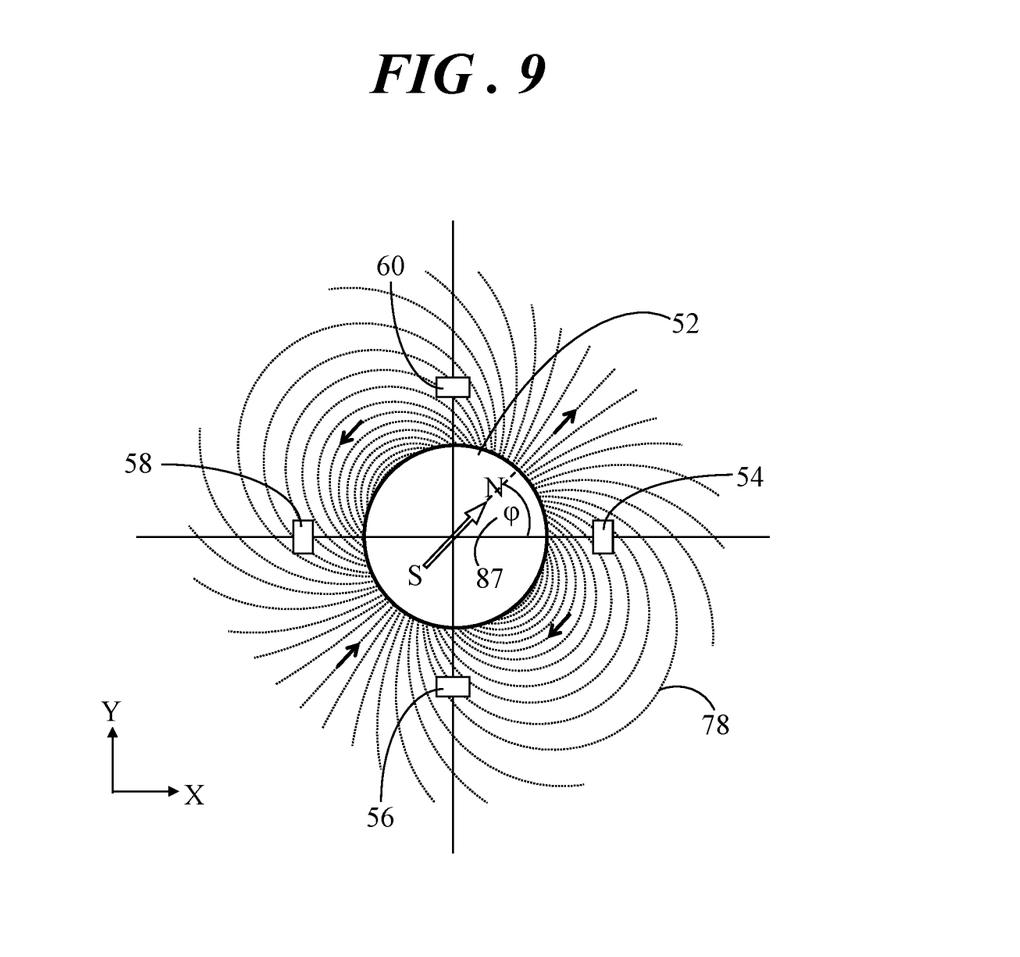
FIG. 9 shows another top view of the dipole magnet and the arrangement of the magnetic field sensors in which the dipole magnet has rotated relative to the magnetic field sensors.

FIG. 9 shows another top view of dipole magnet 52 and the arrangement of the magnetic field sensors 54, 56, 58, 60 in which dipole magnet 52 has rotated relative to magnetic field sensors 54, 56, 58, 60. In accordance with an embodiment, first, second, third, and fourth magnetic field sensors 54, 56, 58, 60 are configured to operate in the saturation mode. As mentioned briefly above, in the saturation mode, the absolute value of the field, |H|, at each of magnetic field sensors 54, 56, 58, 60 is sufficiently large such that each of magnetic field sensors 54, 56, 58, 60 is almost exclusively sensitive to the direction of the field, H, and not to its absolute value, |H|. The saturation condition is reached when the absolute value, |H|, is much greater than HKeff, where HKeff is a field value that is derived from the sum of the sensor's demagnetization energy term and its anisotropy energy term (as a function of the magnetization angle). Magnetic coupling energy terms are additionally involved for complex multilayer structures like GMR and TMR. In thin-film NiFe AMR sensors and in GMR and TMR sensors these can add up to a few kA/m (kiloampere/meter). The magnetization in the free layer of the magnetoresistive sensor for |H|>>HKeff is almost in the same direction as the total field, H. Hence, a change in the field strength would not change or minimally change the response of the magnetoresistive sensor (e.g., first, second, third, and fourth magnetic field sensors 54, 56, 58, 60). However, rotation of dipole magnet 52 causes a change in the rotation angle 87, φ, which results in a change in the response of the magnetoresistive sensor (e.g., the first, second, third, and fourth output signals of first, second, third, and fourth magnetic field sensors 54, 56, 58, 60, respectively).

Figure 10:
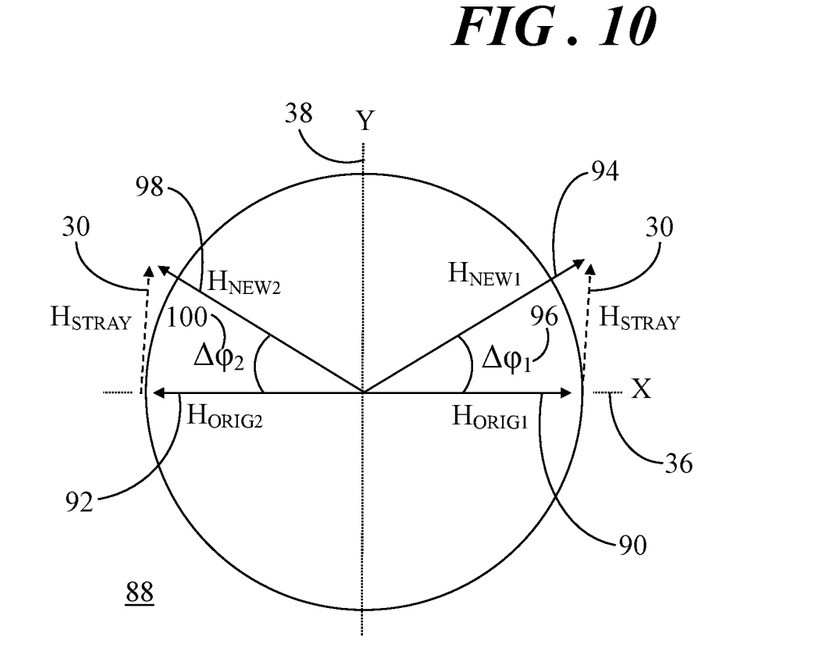
FIG. 10 shows a graph demonstrating the sensitivity of the magnetic field sensors of FIG. 9 to an unwanted stray magnetic field.

Referring now to FIG. 10, FIG. 10 shows a graph 88 demonstrating the sensitivity of first and second magnetic field sensors 54, 56 to the unwanted stray magnetic field 30, labeled $H_{STRAY}$. Third and fourth magnetic field sensors 58, 60 (FIG. 6) are also sensitive to stray magnetic field 30. However, the sensitivity of third and fourth magnetic field sensors 58, 60 to stray magnetic field 30 is ignored in this initial discussion for simplicity. Like graph 34 of FIG. 5, graph 88 shows vectors in a Cartesian coordinate system that includes X-axis 36 and Y-axis 38.

Since first and second magnetic field sensors 54, 56 are operating in the saturation mode, their respective first and second output signals reflect the direction of magnetic field 78 (FIG. 8) and not the field strength of magnetic field 78. In the saturation mode, a first vector 90, labeled $H_{ORIG1}$, represents magnetic field 78 at the position of first magnetic field sensor 54 (shown in FIG. 8) in the absence of stray magnetic field 30. In this example, the rotation angle, $\varphi_1$, for first magnetic field sensor 54 is zero. Likewise, a second vector 92, labeled $H_{ORIG2}$, represents magnetic field 78 at the position of second magnetic field sensor 56 (shown in FIG. 8) in the absence of stray magnetic field 30. Again, a rotation angle, $\varphi_2$, for second magnetic field sensor 56 is zero. Accordingly, rotation angles, $\varphi_1$ and $\varphi_2$, are not visible in FIG. 10.

A first vector 94 represents the total in-plane magnetic field at the position of first magnetic field sensor 54 when stray magnetic field 30, labeled $H_{STRAY}$, is introduced. The introduction of stray magnetic field 30 at first magnetic field sensor 54 leads to an angular error 96, labeled $\Delta\varphi_1$, in a first angular output signal of first magnetic field sensor 54. Thus, first vector 94 reflects a first stray field component, e.g., angular error 96. Similarly, the introduction of stray magnetic field 30 at second magnetic field sensor 56 leads to an angular error 100, labeled $\Delta\varphi_2$, in a second angular output signal of second magnetic field sensor 56. Thus, second vector 98 reflects a second stray field component, e.g., angular error 100. In this example, angular error 100, $\Delta\varphi_2$, is almost opposite to angular error 96, $\Delta\varphi_1$.

Figure 11:
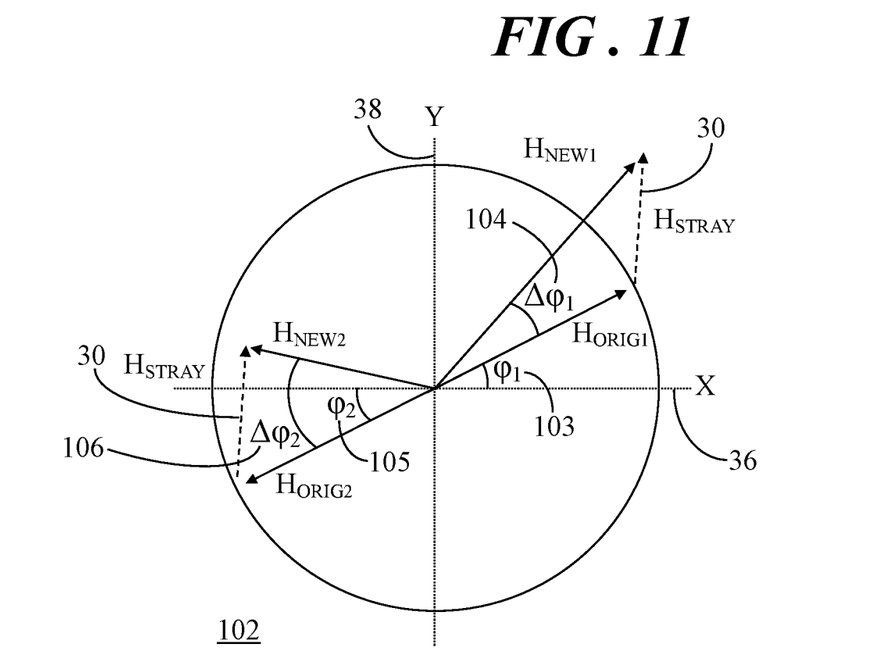
FIG. 11 shows another graph demonstrating the sensitivity of the magnetic field sensors of FIG. 9 to an unwanted stray magnetic field.

Referring now to FIG. 11, FIG. 11 shows another graph 102 demonstrating the sensitivity of first and second magnetic field sensors 54, 56 (shown in FIG. 8) to the unwanted stray magnetic field 30, labeled $H_{STRAY}$. Again, since first and second magnetic field sensors 54, 56 are operating in the saturation mode, their respective first and second output signals reflect the direction of magnetic field 78 (FIG. 8) and not the field strength of magnetic field 78. In the example of FIG. 11, graph 102 shows rotation angles 103, 105 of $\varphi_1$ and $\varphi_2$ that are non-zero. The introduction of stray magnetic field 30 at first magnetic field sensor 54 leads to an angular error 104, labeled $\Delta\varphi_1$, and the introduction of stray magnetic field 30 at second magnetic field sensor 56 leads to an angular error 106, labeled $\Delta\varphi_2$. Also in this example, the sign of angular error 106, $\Delta\varphi_2$, is almost opposite to angular error 104, $\Delta\varphi_1$.

Processing circuit 62 (FIG. 6) is configured to combine first and second output signals 94, 98 to obtain a rotation angle value (e.g., a compensated output angle) in which the first and second stray components (e.g., angular errors 96, 100 of FIG. 10 or angular errors 104, 106 of FIG. 11) are substantially cancelled. By way of example, the processing circuit 62 may at least partially cancel the angular error by calculating an arithmetic mean which can be expressed as follows:

$$\varphi_{OUT} = \frac{\varphi_{NEW1} + \varphi_{NEW2}}{2} = \frac{(\varphi_1 + \Delta\varphi_1) + (\varphi_2 + \Delta\varphi_2)}{2} \approx -\varphi \quad (1)$$

In the expression (1) and in all other expressions, all angles are defined anticlockwise, φ is the input angle representing the angular position of dipole magnet 52 (FIG. 6) relative to first and second magnetic field sensors 54, 56. The expressions $\varphi_{NEW1}$ and $\varphi_{NEW2}$ represent the total angles, the expressions $\varphi_1$ and $\varphi_2$ represent the rotation angles at the sensor positions in the absence of stray magnetic field 30, the expressions $\Delta\varphi_1$ and $\Delta\varphi_2$ represent angular errors of the in-plane magnetic field vectors at the positions of first and second magnetic field sensors 54, 56, respectively, and the expression $\varphi_{OUT}$ represents the compensated output angle. The compensated output angle is the arithmetic mean of first and second output signals 94, 98 in which the angular errors $\Delta\varphi_1$ and $\Delta\varphi_2$ approximately cancel one another to yield a rotation angle value, $\varphi_{OUT}$. Accordingly, for two sensors (e.g., first and second magnetic field sensors 54, 56) that measure magnetic fields ($H_{ORIG1}$ and $H_{ORIG2}$) which have opposite directions, stray magnetic field 30 has approximately opposite effects on the angles of the total fields, $H_{NEW1}$ and $H_{NEW2}$. Both original magnetic fields ($H_{ORIG1}$ and $H_{ORIG2}$) rotate almost synchronously in the same direction so that the opposite phase and therefore the opposite effects are maintained over the entire three-hundred-and-sixty-degree rotation. The rotation angle value, (POUT, is almost equal to the opposite of the rotation angle, −φ, of dipole magnet 52 since both of the rotation angles $\varphi_1$ and $\varphi_2$ at the sensor positions equal the rotation angle, −φ, for a perfect diametrically magnetized magnet that is additionally perfectly centered with respect to first and second magnetic field sensors 54, 56.

Figures 12, 13, 14:
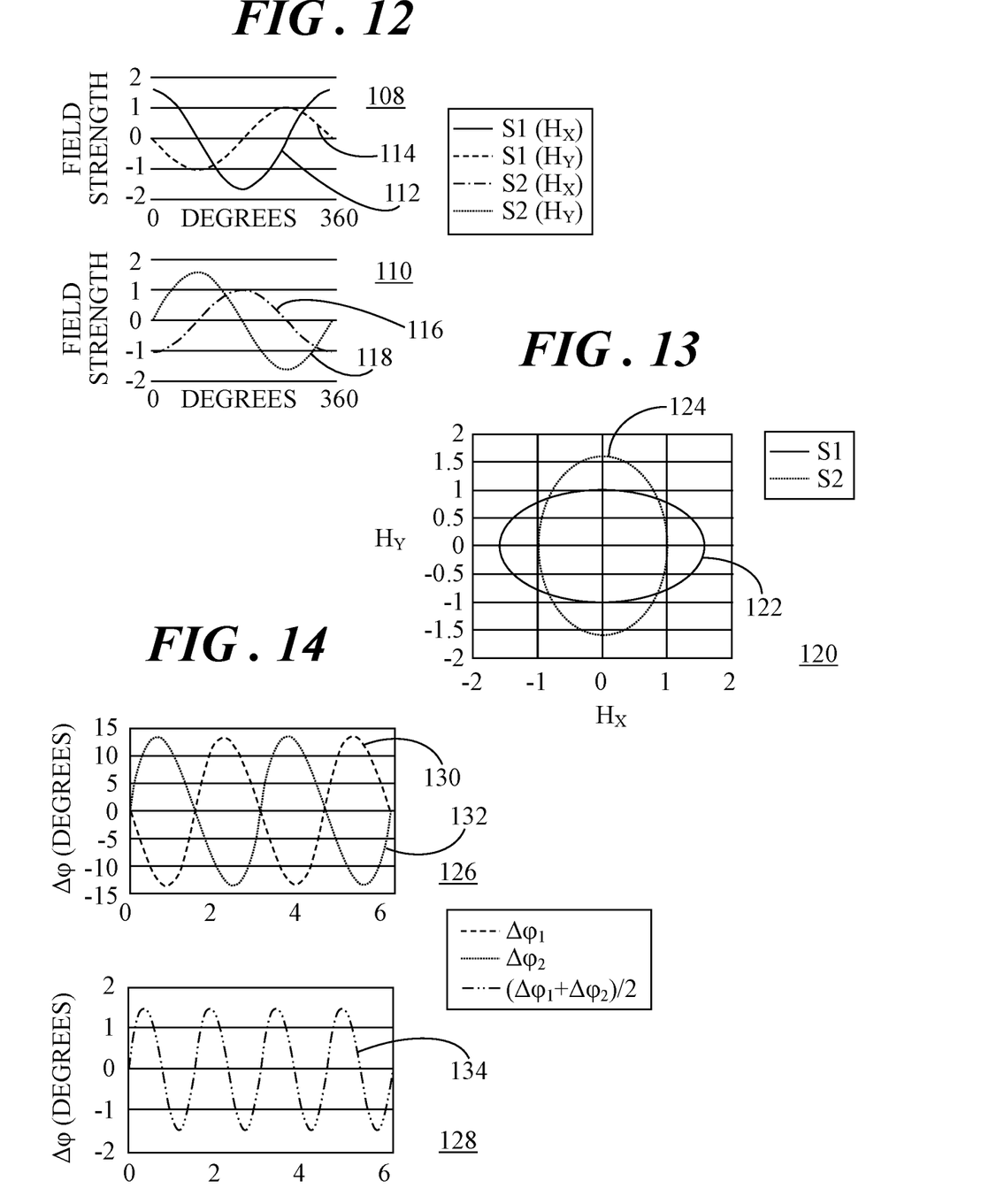
FIG. 12 shows a pair of graphs demonstrating example waveforms for two of the magnetic field sensors of the system of FIG. 6.
FIG. 13 shows a graph of the $H_X$ and $H_Y$ components of the waveforms of FIG. 12 plotted against one another for a full rotation of the dipole magnet of the system of FIG. 6.
FIG. 14 shows a pair of graphs demonstrating angular error for two of the magnetic field sensors of the system of FIG. 6 as well as a combined angular error of the two magnetic field sensors.

FIG. 12 shows a pair of graphs 108, 110 demonstrating example waveforms for first and second magnetic field sensors 54, 56 of system 50 (FIG. 6). The horizontal axis of each of graphs 108, 110 represents a full 360° rotation of dipole magnet 52 (FIG. 6) relative to first and second magnetic field sensors 54, 56. The vertical axis of each of graphs 108, 110 represents the magnetic field strength of the $H_X$ and $H_Y$ components at the locations of first and second magnetic field sensors 54, 56 and in response to the rotation of dipole magnet 52. Again, since first and second magnetic field sensors 54, 56 are operating in the saturation mode, the angle of the magnetic field at the position of first magnetic field sensor 54 and at the position of the second magnetic field sensor 56 is measured. Thus, a first waveform 112 represents the $H_X$ components of the field strength at the location of first magnetic field sensor 54, labeled S1($H_X$), and a second waveform 114 represents the $H_Y$ components of the field strength at the location of first magnetic field sensor 54, labeled S1($H_Y$). Similarly, a third waveform 116 represents the $H_X$ components of the field strength at the location of second magnetic field sensor 56, labeled S2($H_X$), and a fourth waveform 118 represents the $H_Y$ components of the field strength at the location of second magnetic field sensor 56, labeled S2($H_Y$).

It can be observed from graph 108 that the amplitude of first waveform 112 (representing the $H_X$ component at the position of first magnetic field sensor 54) is greater than the amplitude of second waveform 114 (representing the $H_Y$ component at the position of first magnetic field sensor 54). It can be observed from graph 110 that the amplitude of fourth waveform 118 (representing the $H_Y$ component at the position of second magnetic field sensor 56) is greater than the amplitude of third waveform 116 (representing the $H_X$ component at the position of second magnetic field sensor 56).

FIG. 13 shows a graph 120 of the $H_X$ and $H_Y$ components of waveforms 112, 114, 116, 118 of FIG. 12 plotted against one another for a full 360° rotation of dipole magnet 52. The horizontal axis of graph 120 represents the $H_X$ components and the vertical axis of graph 120 represents the $H_Y$ components. A first ellipse 122 represents first and second waveforms 112, 114 plotted against one another and a second ellipse 124 represents third and fourth waveforms 116, 118 plotted against one another. Under ideal conditions, first and second ellipses would be circular if the magnet is infinitely long. But for practical magnets with finite height, the response will be elliptical over a full rotation of dipole magnet 52 as illustrated by first and second ellipses 122, 124. An ellipse with unequal (semi) axes a and b (i.e., an ellipse ratio b/a that is not equal to 1) results in an output angle, $\varphi_{OUT}$, that deviates from the negative of the rotation angle of dipole magnet 52, $-\varphi$. This may be referred to as elliptic distortion. The inequality of the ellipse axes originates from the magnetic field component perpendicular to the outer cylindrical surface of dipole magnet 52 being stronger than the magnetic field component in the circumferential direction. The figures presented herein give an example for one particular choice of the dimensions of the magnet. This elliptical distortion may lead to a significant angular error $\Delta\varphi$.

FIG. 14 shows a pair of graphs 126, 128 demonstrating angular error for two of the magnetic field sensors of the system of FIG. 6 as well as a combined angular error of the two magnetic field sensors. More particularly, graph 126 shows a first waveform 130 of a first angular error, $\Delta\varphi_1$, for first magnetic field sensor 54 and a second waveform 132 of a second angular error, $\Delta\varphi_2$, for second magnetic field sensor 56. For a single magnetic field sensor (e.g., first or second magnetic field sensor 54, 56), the maximum angular error may be almost 15 degrees for a certain ellipse ratio (corresponding to a given height of the magnet) due to the elliptical distortion.

In contrast, graph 128 shows a third waveform 134 of angular error, $\Delta\varphi$, when first and second output signals 94, 98 (FIGS. 10-11) are combined in accordance with expression (1) presented above (e.g., $(\Delta\varphi_1+\Delta\varphi_2)/2$). Finding the arithmetic mean of first and second output signals 94, 96 yields a maximum angular error of approximately 1.2 degrees due to the elliptical distortion. Therefore, following compensation in accordance with expression (1), the output angle, $\varphi_{OUT}$, is still unequal to the negative of the input angle, $-\varphi$. However, some compensation for angular error did occur.

Figure 15:
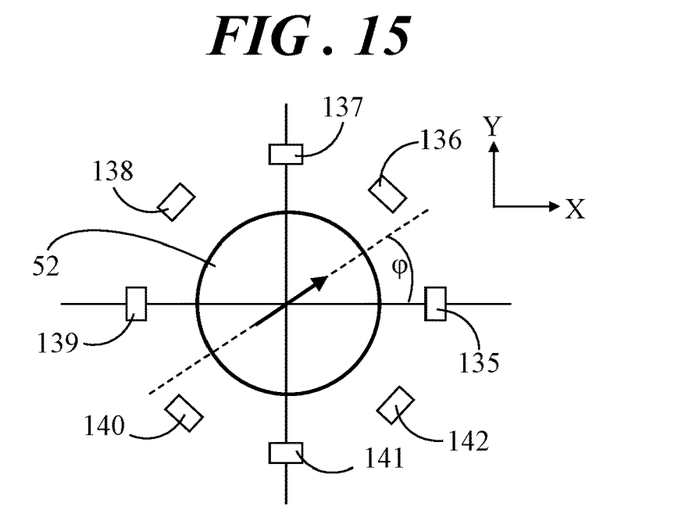
FIG. 15 shows a top view of an arrangement of magnetic field sensors surrounding the dipole magnet that may be implemented within the system of FIG. 7 in accordance with another embodiment.

FIG. 15 shows a top view of an arrangement of magnetic field sensors surrounding dipole magnet 52 that may be implemented within the system of FIG. 6 in accordance with another embodiment. Further reductions in angular error may be achieved by including additional sensors. Thus, the arrangement shown in FIG. 15 includes a total of eight magnetic field sensors. The arrangement includes first, second, third, and fourth magnetic field sensors 135, 136, 137, 138, respectively. Additionally, the arrangement shown in FIG. 15 includes fifth, sixth, seventh, and eighth and sixth magnetic field sensors 139, 140, 141, 142, respectively. Accordingly, magnetic field sensors 135, 136, 137, 138, 139, 140, 141, 142 are arranged ±45° about circular path 72 relative to one another to yield a differential arrangement of sensors.

Figure 16:
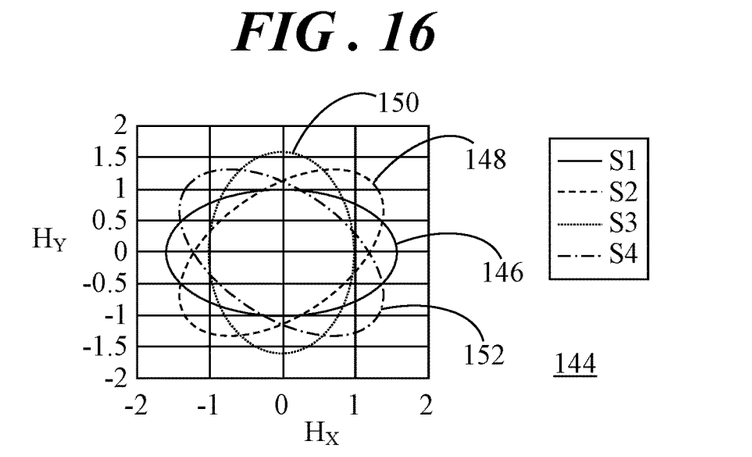
FIG. 16 shows a graph of the $H_X$ and $H_Y$ components of the magnetic field at all of the magnetic field sensors of FIG. 15 plotted against one another for a full rotation of the dipole magnet of the system of FIG. 6.

FIG. 16 shows a graph 144 of the $H_X$ and $H_Y$ components of the magnetic field at first, second, third, and fourth magnetic field sensors 135, 136, 137, 138 plotted against one another for a full rotation of dipole magnet 52 of the arrangement of FIG. 15. The response of fifth, sixth, seventh, and eighth magnetic field sensors 139, 140, 141, 142 is ignored in this initial discussion for simplicity. The horizontal axis of graph 144 represents the $H_X$ components and the vertical axis of graph 144 represents the $H_Y$ components. A first ellipse 146 represents the $H_X$ and $H_Y$ components of the magnetic field at first magnetic field sensor 135, labeled S1. A second ellipse 148 represents the $H_X$ and $H_Y$ components of the magnetic field at second magnetic field sensor 136, labeled S2. A third ellipse 150 represents the $H_X$ and $H_Y$ components of the magnetic field at third magnetic field sensor 137, labeled S3. A fourth ellipse 152 represents the $H_X$ and $H_Y$ components of the magnetic field at fourth magnetic field sensor 138, labeled S4.

Figure 17:
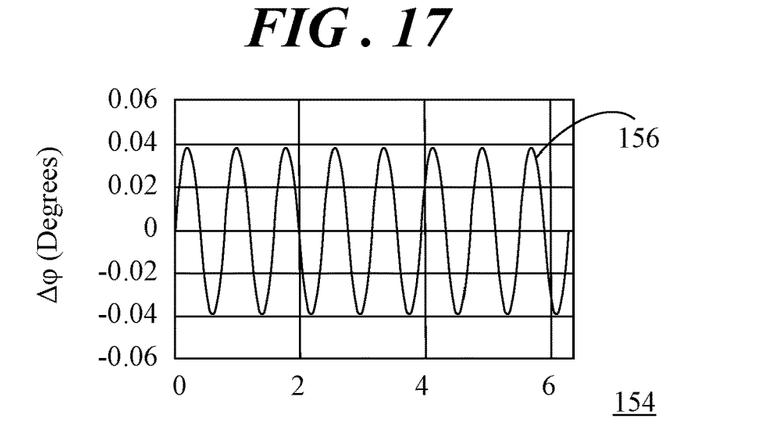
FIG. 17 shows a graph of a combined angular error of the magnetic field sensors of FIG. 15.

FIG. 17 shows a graph 154 of a combined angular error of the magnetic field sensors of FIG. 15. That is, graph 154 shows a waveform 156 of angular error, $\Delta\varphi$, when the arithmetic mean of the output signals from each of first, second, third, and fourth magnetic field sensors 135, 136, 137, 138 is computed. Processing circuit 62 (FIG. 6) may thus be configured to combine first, second, third, and fourth output signals from the respective first, second, third, and fourth magnetic field sensors 135, 136, 137, 138 to obtain a rotation angle value (e.g., a compensated output angle) in which associated first, second, third, and fourth stray components (e.g., angular errors) are substantially cancelled. Again, processing circuit 62 may strongly cancel the angular errors by calculating the arithmetic mean as follows:

$$\varphi_{OUT} = \frac{\varphi_{NEW1} + \varphi_{NEW2} + \varphi_{NEW3} + \varphi_{NEW4}}{4} \quad (2)$$

-continued $$= \frac{(\varphi_1 + \Delta\varphi_1) + (\varphi_2 + \Delta\varphi_2) + (\varphi_3 + \Delta\varphi_3) + (\varphi_4 + \Delta\varphi_4)}{4}$$

$$= \frac{\varphi_1 + \varphi_2 + \varphi_3 + \varphi_4}{4}$$

$$\approx -\varphi$$

Taking the arithmetic mean of the rotation angles from first, second, third, and fourth magnetic field sensors 135, 136, 137, 138, respectively (and momentarily ignoring the rotation angles from the remaining magnetic field sensors 139, 140, 141, 142) can further reduce the overall angular error due to the elliptical distortion. In this example, the arithmetic mean of the output signals from first, fifth, second, and sixth magnetic field sensors 54, 136, 56, 138 may yield a maximum angular error of approximately 0.04 degrees due to the elliptical distortion.

Accordingly, the compensation strategy utilizing four magnetic field sensors operating in saturation in the arrangement of FIG. 15 may significantly reduce the angular error due to the elliptical distortion. A generalized expression for calculating the arithmetic mean can be set forth as follows:

$$\varphi_{OUT} = \frac{\varphi_{NEW1} + \varphi_{NEW2} + \ldots + \varphi_{NEWn}}{n} \qquad (3)$$

$$= \frac{(\varphi_1 + \Delta\varphi_1) + (\varphi_2 + \Delta\varphi_2) + \ldots + (\varphi_n + \Delta\varphi_n)}{n}$$

$$= \frac{\varphi_1 + \varphi_2 + \ldots + \varphi_n}{n}$$

$$\approx -\varphi$$

In expression (3), the term "n" refers to the total number of magnetic field sensors utilized within a particular arrangement. Thus, expression (3) denotes that the arithmetic mean can be calculated in accordance with the total number of magnetic field sensors implemented within a system for determining the angular position of dipole magnet 52, and by extension, the structure upon which dipole magnet 52 is coupled.

Although an arithmetic mean is discussed herein, in alternative embodiments, the geometric mean may be used for generating the output angle, $\varphi_{OUT}$. Utilization of the geometric mean may be advantageous when only the ellipticity from the finite height of dipole magnet 52 is present. The geometric mean then leads to zero error in the output angle. At increasing stray magnetic fields and lateral displacement of dipole magnet 52 relative to the magnetic sensors, the advantages associated with utilizing the geometric mean may be significantly reduced.

Given the above discussion presented with FIGS. 12-17, an arrangement of two magnetic field sensors (e.g., first and second magnetic field sensors 54, 56 of FIG. 6) or an arrangement of four magnetic field sensors (e.g., first, second, third, and fourth magnetic field sensors 135, 136, 137, 138 of FIG. 15) may effectively compensate for angular errors due to the effect of stray magnetic field 30 (FIGS. 10-11). Additionally, a differential configuration (e.g., the four magnetic field sensors 54, 56, 58, 60 of FIG. 6 or the eight magnetic field sensors 135, 136, 137, 138, 139, 140, 141, and 142 of FIG. 15) may increase the robustness of these arrangements of magnetic field sensors against misalignments of dipole magnet 52 in any of X-, Y-, and/or Z-directions relative to the differentially configured magnetic field sensors.

Although arrangements of two, four, and eight magnetic field sensors are shown and/or described herein, the quantity and positions of the magnetic field sensors may vary in accordance with the accuracy and size requirements of a particular application. In particular, other arrangements of pairs of magnetic field sensors may be defined in which the magnetic field at the locations of the magnetic field sensors has the opposite direction. Further, two magnetic field sensors spaced ninety degrees apart may be implemented. Alternatively, an uneven quantity of magnetic field sensors (e.g., three, five, seven, etc.) may be implemented. Still further, non-uniformly distributed magnetic field sensor arrangements may be applied with weighting factors that are inversely proportional to the local density of magnetic field sensors.

Methodology performed by system 50 (FIG. 6) for determining the angular position of dipole magnet 52, configured to produce a magnetic field, thus entails operating two or more magnetic field sensors (e.g., magnetic field sensors 54, 56, 58, 60) in a saturation mode in which the magnetic field sensors are sensitive to a direction of the magnetic field and largely insensitive to a field strength of the magnetic field. Each magnetic field sensor produces an output signal that is indicative of the direction of the magnetic field at the location of the magnetic field sensor, the output signal including a stray field component. The output signals from the two or more magnetic field sensors are combined at the processing circuit 62 to obtain a rotation angle value of the dipole magnet. The output signals may be combined by taking an arithmetic mean, which substantially cancels the stray field components to yield a rotation angle value that has been corrected, or otherwise compensated, for angular error caused by a stray magnetic field.

Figure 18:
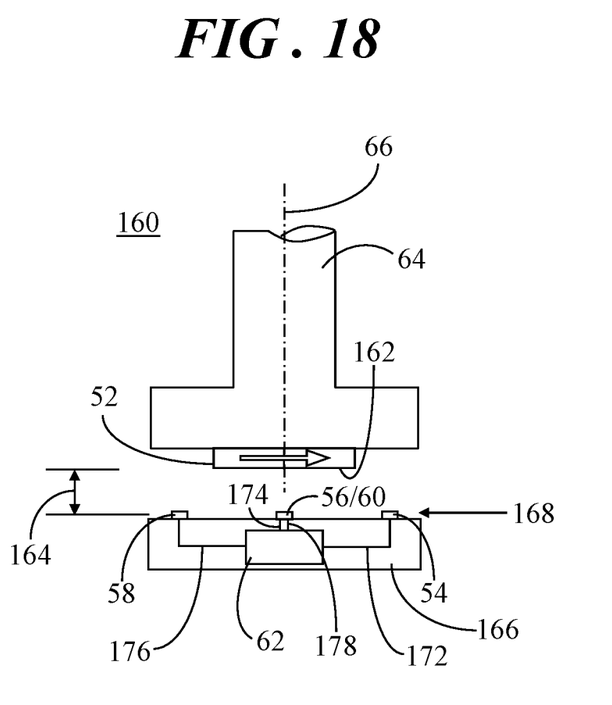
FIG. 18 shows a simplified side view of a system in accordance with another embodiment.

FIG. 18 shows a simplified side view of a system 160 in accordance with another embodiment. In this illustrated configuration, system 160 includes dipole magnet 52 and first, second, third, and fourth magnetic field sensors 54, 56, 58, 60. In the side view illustration, second and fourth magnetic field sensors 56, 60 are aligned with one another as viewed into and out of the page upon which system 160 is presented. The reference numerals 56/60 represent this alignment. Dipole magnet 52 may be glued or otherwise attached to rotatable object 64 such as an axle, shaft, and the like. Thus, rotatable object 64 and dipole magnet 52 (by virtue of its attachment to rotatable object 64) are configured to rotate about axis of rotation 66.

First, second, third, and fourth magnetic field sensors 54, 56, 58, 60 are arranged in four different locations along a circular path (e.g., circular path 72 of FIG. 7) as discussed previously. Additionally in system 160 of FIG. 18, first, second, third, and fourth magnetic field sensors 54, 56, 58, 60 are vertically displaced away from dipole magnet 52 in system 160. More particularly, magnetic field sensors 54, 56, 58, 60 are spaced apart from a base 162 of dipole magnet 52 such that an air gap 164 is formed between base 162 and magnetic field sensors 54, 56, 58, 60. First, second, third, and fourth magnetic field sensors 54, 56, 58, 60 may be fabricated on, or otherwise integrated with, an application specific integrated circuit (ASIC) 166. Thus, first, second, third, and fourth magnetic field sensors 54, 56, 58, 60 may be formed in a common (e.g., the same) plane 168 of ASIC 166 that is substantially parallel to and spaced apart from base 162 of dipole magnet 52.

ASIC 166 may implement, among other features, processing circuit 62 that is customized to function with first, second, third, and fourth magnetic field sensors 54, 56, 58, 60. Processing circuit 62 is represented in ASIC 166 of FIG.

18 by a simple block with a first conductive pathway 172 interconnecting first magnetic field sensor 54 to processing circuit 62, a second conductive pathway 174 interconnecting second magnetic field sensor 56 to processing circuit 62, a third conductive pathway 176 interconnecting third magnetic field sensor 58 to processing circuit 62, and a fourth conductive pathway 178 interconnecting fourth magnetic field sensor 60 to processing circuit 62.

With the arrangement of magnetic field sensors 54, 56, 58, 60, air gap 164 may be chosen such that the amplitudes of the perpendicular and circumferential components of the magnetic field are just equal. Elliptical distortion is then absent, but a small deviation from the ideal distance then brings back the elliptical distortion, and the stray field sensitivity associated with this elliptical distortion. Additionally, the arrangement of magnetic field sensors 54, 56, 58, 60 may achieve the practical advantage of integration with ASIC 166 to yield a single die solution. However, this arrangement is more sensitive to misalignment of dipole magnet 52 relative to magnetic field sensors 54, 56, 58, 60, especially along the Z-axis.

Embodiments described herein entail systems and methodology for measuring angular rotation of an object. An embodiment of a system comprises a dipole magnet having an axis of rotation, the dipole magnet being configured to produce a magnetic field, a first magnetic field sensor configured to produce a first output signal in response to the magnetic field, and a second magnetic field sensor configured to produce a second output signal in response to the magnetic field, each of the first and second magnetic field sensors being configured to operate in a saturation mode such that the first output signal is indicative of a first direction of the magnetic field and the second output signal is indicative of a second direction of the magnetic field.

Another embodiment of a system comprises a dipole magnet having an axis of rotation, the dipole magnet being configured to produce a magnetic field, a first magnetic field sensor configured to produce a first output signal in response to the magnetic field, the first output signal including a first stray field component, and a second magnetic field sensor configured to produce a second output signal in response to the magnetic field, the second output signal including a second stray field component, each of the first and second magnetic field sensors being configured to operate in a saturation mode such that the first output signal is indicative of a first direction of the magnetic field and the second output signal is indicative of a second direction of the magnetic field, wherein the first and second magnetic field sensors are arranged relative to one another such that the first direction of the magnetic field at the first magnetic field sensor opposes the second direction of the magnetic field at the second magnetic field sensor. The system further comprises a processing circuit configured to receive the first and second output signals and combine the first and second output signals to obtain a rotation angle value in which the first and second stray field components are substantially cancelled.

An embodiment of a method for determining the angular position of a dipole magnet, the dipole magnet having an axis of rotation, wherein the magnet is configured to produce a magnetic field, the method comprising operating a first magnetic field sensor and a second magnetic field sensor in a saturation mode in which the first and second magnetic field sensors are sensitive to a direction of the magnetic field, producing a first output signal at the first magnetic field sensor, the first output signal being indicative of a first direction of the magnetic field at a first location of the first magnetic field sensor, the first output signal including a first stray field component, and producing a second output signal at the second magnetic field sensor, the second output signal being indicative of a second direction of the magnetic field at a second location of the second magnetic field sensor, the second output signal including a second stray field component. The method further comprises combining the first and second output signals to obtain a rotation angle value of the dipole magnet in which the first and second stray field components are substantially cancelled.

Thus, systems include an assembly of magnetic field sensors located in the vicinity of a polarized cylindrical object (e.g., a magnet) whose angular rotation can be accurately measured by combining the outputs of the magnetic field sensors. The implementation of a dipole magnet and multiple magnetic field sensors located outside of a radial dimension of the dipole magnet can allow angular rotation measurements up to 360°. Further, the systems and methodology can achieve stray magnetic field suppression, without the need for shielding structures, for any type of magnetic field sensor that provides a response to the angle of an external magnetic field while generally not providing a response to the field strength of the external magnetic field. Still further, the adverse effects of misalignments (e.g., eccentricity, non-uniformities of the magnet, and so forth) can be strongly reduced by the assembly of the magnetic field sensors for improved angular accuracy, sensitivity, and enhanced robustness.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A system comprising:
    a dipole magnet having an axis of rotation, the dipole magnet being configured to produce a magnetic field;
    a first magnetoresistive (MR) sensor configured to produce a first output signal in response to the magnetic field, the first output signal including a first stray field component; and
    a second MR sensor configured to produce a second output signal in response to the magnetic field, the second output signal including a second stray field component;
    a third MR sensor configured to produce a third output signal in response to the magnetic field, the third output signal including a third stray field component;
    a fourth MR sensor configured to produce a fourth output signal in response to the magnetic field, the fourth output signal including a fourth stray field component, each of the first, second, third, and fourth MR sensors being configured to operate in a saturation mode such that the first output signal is indicative of a first direction of the magnetic field, the second output signal is indicative of a second direction of the magnetic field, the third output signal is indicative of a third direction of the magnetic field, and the fourth output signal is indicative of a fourth direction of the magnetic field; and a processing circuit coupled with the first, second, third, and fourth MR sensors and configured to combine the first, second, third, and fourth output signals to obtain a rotation angle value in which the first, second, third, and fourth stray field components are substantially cancelled.

2. The system of claim 1 wherein the dipole magnet is a cylindrically-shaped dipole magnet.

3. The system of claim 2 wherein the cylindrically-shaped dipole magnet is diametrically magnetized.

4. The system of claim 1 wherein the first and second MR sensors are spaced apart from an outer surface of the dipole magnet such that a gap is formed between the outer surface and the first and second MR sensors.

5. The system of claim 1 wherein the first and second MR sensors are positioned relative to one another such that the first direction of the magnetic field at the first magnetic field sensor opposes the second direction of the magnetic field at the second magnetic field sensor.

6. The system of claim 1 wherein the first and second MR sensors are arranged at two locations along a circular path about the axis of rotation of the dipole magnet, the circular path having a radius that is greater than a radial dimension of the dipole magnet.

7. The system of claim 6 wherein the circular path is spaced apart from a base of the dipole magnet, the base being perpendicular to the axis of rotation.

8. The system of claim 6 wherein the first and second magnetic MR sensors are spaced ninety degrees apart from one another along the circular path.

9. The system of claim 8 wherein the third and fourth MR sensors are arranged at two additional locations along the circular path such that the third and fourth MR sensors are spaced ninety degrees apart from one another along the circular path.

10. A method for determining the angular position of a dipole magnet, the dipole magnet having an axis of rotation, wherein the magnet is configured to produce a magnetic field, the method comprising:

operating first, second, third, and fourth magnetoresistive (MR) sensors in a saturation mode in which each of the first, second, third, and fourth MR sensors are sensitive to a direction of the magnetic field;

producing a first output signal at the first MR sensor, the first output signal being indicative of a first direction of the magnetic field at a first location of the MR sensor, the first output signal including a first stray field component;

producing a second output signal at the second MR sensor, the second output signal being indicative of a second direction of the magnetic field at a second location of the second MR sensor, the second output signal including a second stray field component;

producing a third output signal at the third MR sensor, the third output signal being indicative of a third direction of the magnetic field at a third location of the third MR sensor, the third output signal including a third stray field component;

producing a fourth output signal at the fourth MR sensor, the fourth output signal being indicative of a fourth direction of the magnetic field at a fourth location of the fourth MR sensor, the fourth output signal including a fourth stray field component; and combining the first, second, third, and fourth output signals to obtain a rotation angle value of the dipole magnet in which the first, second, third, and fourth stray field components are substantially cancelled.

11. The method of claim 10 wherein the first and second locations of the first and second magnetic field sensors are along a circular path about the axis of rotation of the dipole magnet, the circular path having a radius that is greater than a radial dimension of the dipole magnet, and the method further comprises positioning the first and second MR sensors relative to one another such that the first direction of the magnetic field at the first location opposes the second direction of the magnetic field at the second location.

* * * * *